Figure 1:
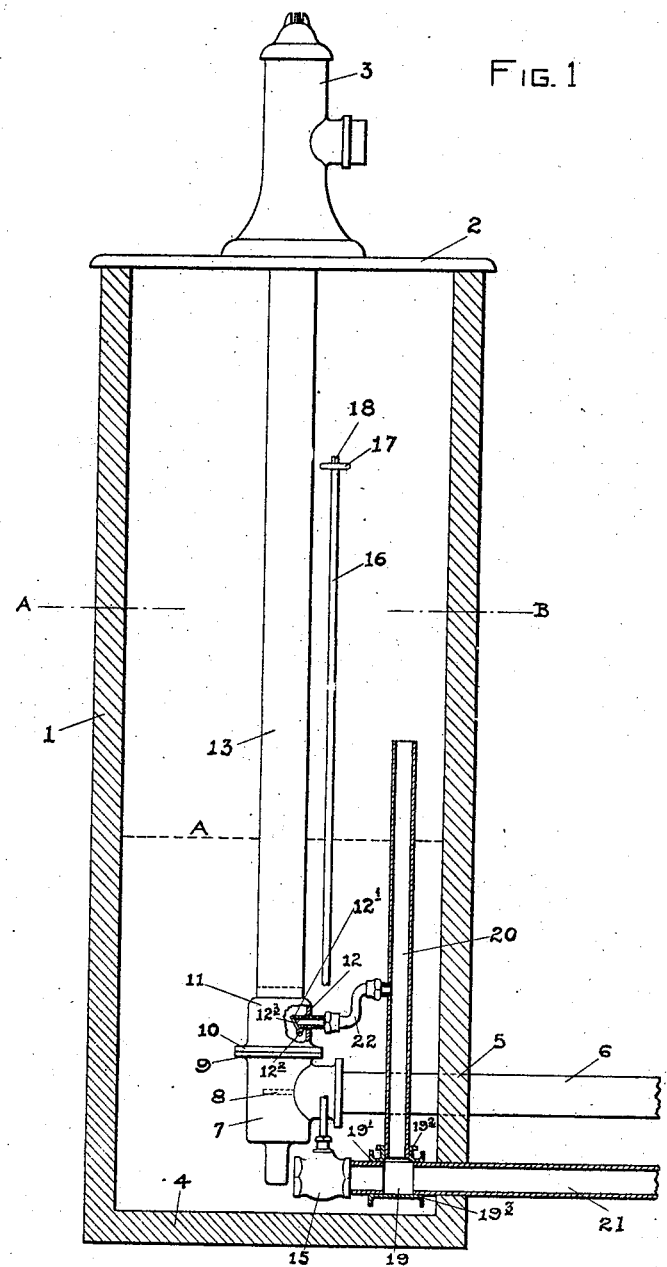

No. 847,294. PATENTED MAR. 12, 1907.
J. PYE.
MEANS FOR THE PREVENTION OF FREEZING OF WATER HYDRANTS.
APPLICATION FILED MAY 9, 1904.

2 SHEETS—SHEET 1.

WITNESSES
Carl Meltzer
William G. Blomstran.

INVENTOR
James Pye

No. 847,294. PATENTED MAR. 12, 1907.
J. PYE.
MEANS FOR THE PREVENTION OF FREEZING OF WATER HYDRANTS.
APPLICATION FILED MAY 9, 1904.

2 SHEETS—SHEET 2.

WITNESSES
Carl Meltzer
William G. Blomstran

INVENTOR
James Pye

UNITED STATES PATENT OFFICE.

JAMES PYE, OF CHICAGO, ILLINOIS.

MEANS FOR THE PREVENTION OF FREEZING OF WATER-HYDRANTS.

No. 847,294.	Specification of Letters Patent.	Patented March 12, 1907.

Application filed May 9, 1904. Serial No. 207,168.

*To all whom it may concern:*

Be it known that I, JAMES PYE, a citizen of the United States, residing at Chicago, in the county of Cook and State of Illinois, have invented new and useful Means for the Prevention of Freezing of Water-Hydrants, of which the following is a specification.

My invention relates to arrangements whereby the freezing of hydrants, underground pipe connections, and valves used for the circulation of water is prevented.

The object of my invention is to provide means through the use of which all possible stoppage of the flow of water by the formation of ice or icicles in or around the valves, pipe connections, and basins is entirely obviated, always insuring a perfectly free flow of water no matter how low the surrounding temperature in the basin surrounding the valves and pipes may be.

By my invention all danger arising from the stoppage of the flow of water to be used for fire-fighting purposes will be done away with and at the same time the cost of maintenance and of labor reduced and the need of means for artificially heating and keeping the basins and hydrants at a sufficiently high temperature to prevent the freezing of the water done away with.

Heretofore basins inclosing hydrants have been fitted up with a false bottom, so as to prevent the cold from reaching the valves below and to keep the warm damp air from escaping upwardly, as it is a well-known fact that the cold air always has a tendency to rush in a downward direction, while heat at all times rises. Not only a false bottom, placed about midway between the street-level and the valves, but also a wrapping of straw or hay, and mostly an addition of manure placed tightly around the hydrant, is resorted to to insure the flow of water in cold weather, and even then they sometimes freeze in very severe weather. All this is done away with in my improvement.

I have discovered that if the hydrant be so arranged that the water in the pipe when the hydrant is not in use can be kept at a certain level and the basin surrounding the hydrant be filled to a point above the hydrant-pipe water-level with a liquid which is preferably non-freezing, such as a briny solution, the fresh water in the hydrant-pipe will not freeze in the severest weather. I believe that this immunity from freezing is due to the fact that the uncongealed liquid does not conduct the heat in the hydrant-pipe and inclosed water away sufficiently to lower the temperature of the water to or below the freezing-point; but, whatever the reason, I claim the combination whereby this result is produced as my invention.

To carry out my invention, I preferably employ the structure illustrated in the two sheets of drawings annexed hereto, in which the same reference characters are used to designate identical parts in all the figures, in which—

Figure 2:
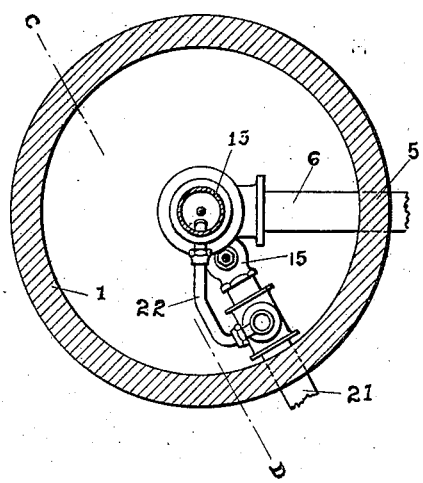
Figure 3:
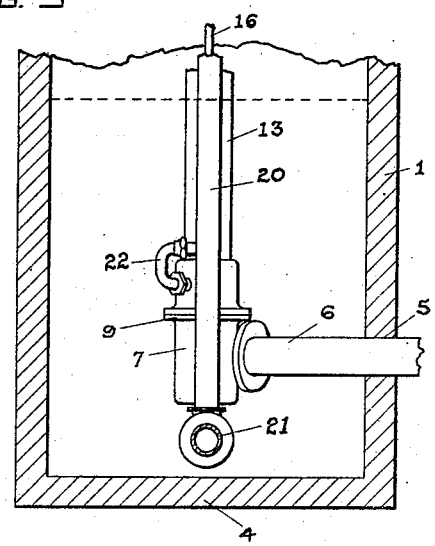
Figure 4:
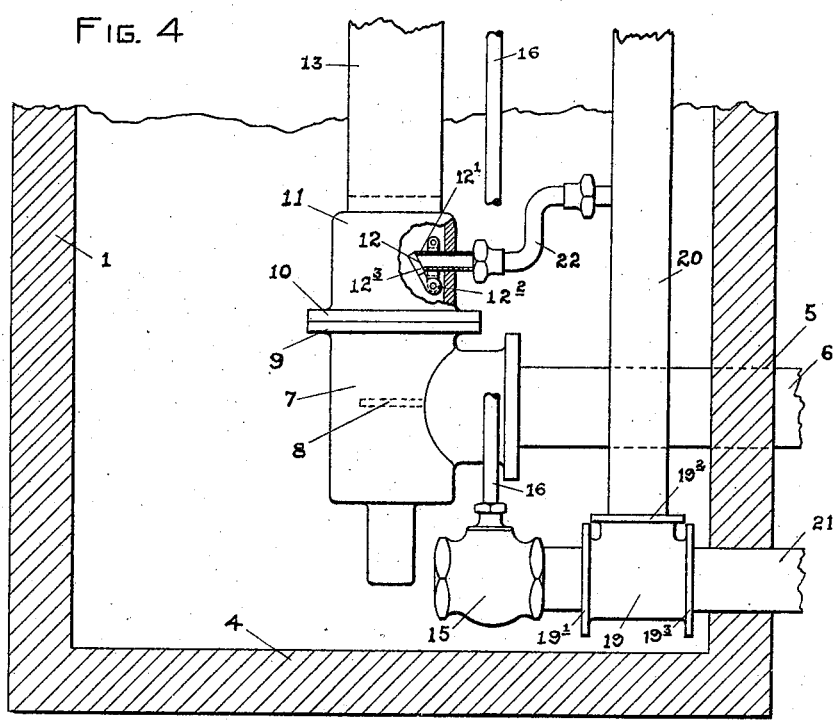

Figure 1 is a vertical sectional view of a basin containing my invention, exposing to view the hydrant and pipe connections usually found in connection with a fire-plug. Fig. 2 is a top plan view of the basin and its interior fittings, a section being taken on the line A B of Fig. 1. Fig. 3 is a side view showing the bottom of basin in section and showing the valves and pipe connections in elevation, and Fig. 4 is a section taken on the line C D of Fig. 2.

Similar figures refer to similar parts throughout the several views.

The basin 1, with its cover 2 supporting the fire-plug 3 thereon, is built as usual and is preferably of the usual depth. It should be water-tight. At or near the bottom 4 of the basin 1 is an aperture 5, through which passes the inlet-pipe 6, which is connected with the valve-body 7 of the inlet-valve 8. The flange 9 of the valve-body 7 is connected to the flange 10 of another valve-housing 11, which, with its inclosed valve 12, will be described later. Screwed into or otherwise suitably secured to the valve-housing 11 is the pipe 13, which serves as passage for the water to be used from the fire-plug 3. A small valve 15, which has a long valve stem or rod 16 thereon extending upwardly and which is adapted to be turned on or off by hand or wrench by means of a hand-wheel 17 or a wrench applied to a suitable hexagonal, octagonal, or square shaped end 18, is connected to a T-shaped pipe-fitting 19 by the end 19' of its three sides. The end $19^2$ has a vertical pipe 20 screwed into it, and the end $19^3$ forms a connection with the sewer-pipe 21. The pipe 20 is connected by a smaller leaden or soft-metal pipe 22 with the valve-housing 11, thereby forming a passage between the outlet-pipe 13, pipe 20, and the sewer-pipe 21.

To obtain my objects in view, the basin 1 is filled to a line indicated on the drawing by the letter A with a liquid, preferably antifreezing and consisting of brine or oil, such height of liquid to be continually maintained. The apertures through which the inlet and sewer pipes are passed through the walls of the basin 1 are preferably made water-tight, and all fittings and pipe connections coming in contact with the salt water or brine are to be coated over with a coat of tar or pitch to prevent the metal from being injured thereby. The valve 12 consists of a valve-seat 12' with a boss $12^2$ attached to its lower side and adapted to have the valve-plate $12^3$ fulcrumed to said boss $12^2$, allowing the valve-plate to swing up against the valve-seat 12' when forced up by the water rushing in and upwardly through the inlet-pipe 6 through the valve-body 7, valve 8, and the pipe 13 when the valve 8 is opened. It will now be seen that when the operator opens the valve 8 and permits the water to rush up through the pipe 13 into the fire-plug 3 the upward movement of the water will force the valve-plate $12^3$ upwardly and against the valve-seat 12', thereby closing the valve 12 tightly. The water having been used as desired and the operator having again shut off the valve 8, it will be seen that the flow of the water in the pipe 13 stopping it will allow the valve-plate $12^3$ to drop according to the laws of gravity, it being heavy enough to overcome the hydrostatic pressure, and all the water contained in the pipe 13 down to the level at which the pipe 22 opens into the pipe 20 will at once pass out through the valve 12 into the pipe 20 and run down through said pipe into the sewer-pipe 21 to be carried off to the sewer. This will entirely carry off all backwater contained in the system after the fire-plug has ceased to use the water. There is, however, some water left below the line on a level with the valve 12 standing in the valve-body 7. To prevent these fittings from clogging up the system and to avoid freezing, the liquid, preferably consisting of the briny solution, which can be discharged during warm weather when needed, is employed, the operator opening the valve 15 to the T 19 and allowing the accumulated water to pass off into the sewer-pipe 21. The system is now cleared entirely of any surplus accumulation. Through the means of the pipe 22 and the valve 12 the water will always keep the same level and prevent it rising any higher in case of bad valves and valve-seats in the inlet-valve 8. The pipe 20, open at the top above the level of the brine, serves as an overflow in case any surface water accidentally gets into the basin and discharges it before it has time to mix with and weaken the brine, and thereby reduce its efficiency. I believe it also has an important function in admitting the warm air from the sewers, which keeps up the temperature of the air in the basin above the liquid, so as to prevent its freezing, even if it is not a non-freezing liquid.

It will be seen that with my arrangement, owing to the facts stated above, all danger of freezing up will be prevented, a low water-level assured, and cleanliness in the system obtained, the brine or salt water surrounding the valves, pipes, and other fittings doing away with the false bottom, straw, hay, and manure.

While I have shown and described my invention as embodied in the form which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is —

1. In a hydrant, the combination with the basin, of the hydrant-pipe connected with the water-mains extending upward therethrough, means for regulating the level at which the water in the pipe shall stand when the hydrant is not in use, a non-freezing liquid such as a solution of salt in the basin extending above the hydrant-pipe water-level, and the sewer drain-pipe extending upward in the basin and opening above the level of the brine.

2. In a hydrant, the combination with the basin, of the hydrant-pipe connected with the water-mains extending upward therethrough, means for regulating the level at which the water in the pipe shall stand when the hydrant is not in use, a protecting liquid in the basin extending above the hydrant-pipe water-level, and the sewer drain-pipe extending upward in the basin and opening above the level of the protecting liquid.

3. In a hydrant, the combination with the basin, of the hydrant-pipe connected with the water-mains extending upward therethrough, means for automatically regulating the level at which the water in the pipe shall stand when the hydrant is not in use, a non-freezing liquid such as a solution of salt in the basin extending above the hydrant-pipe water-level, and the sewer drain-pipe extending upward in the basin above the level of the brine.

4. In a hydrant, the combination with the basin, of the hydrant-pipe connected with the water-mains extending upward therethrough, means for automatically regulating the level at which the water in the pipe shall stand when the hydrant is not in use, a non-freezing liquid such as a solution of salt in the basin extending above the hydrant-pipe water-level, a sewer drain-pipe extending upward in the basin above the level of the brine solution, and a valve opening near the bottom of the basin and adapted to open the sewer drain-pipe to discharge the brine.

5. In a hydrant, the combination with the water-tight basin, of the sewer drain-pipe extending upward therein, the hydrant-pipe connected with the water-main, a valve in said hydrant-pipe near its lower end adapted to close automatically when the water is flowing upward in the hydrant-pipe and to open automatically when the water is at rest therein, connections between said valve and sewer drain-pipe, and a valve adapted to open the sewer drain-pipe and located beneath the level of the valve in the hydrant-pipe.

6. In a hydrant, the combination with the water-tight basin, of the sewer drain-pipe extending into the bottom thereof and having a branch extending vertically upward therein, the hydrant-pipe connected with the water-main, a valve in said hydrant-pipe near its lower end adapted to close automatically when the water is flowing upward in the hydrant-pipe and to open automatically when the water is at rest therein, an antifreezing liquid, such as a solution of salt adapted to fill the lower part of the basin and extending above the valve in the hydrant-pipe and to near the top of the vertical branch of the sewer drain-pipe, connections between the valve in the hydrant-pipe and the vertical branch of the sewer drain-pipe, said connections being located beneath the level of the brine, and a valve in the sewer drain-pipe located near the bottom of the basin and adapted to be opened to discharge the brine therefrom.

7. In a hydrant, the combination with the water-tight basin, of the sewer drain-pipe extending upward therein to about half the depth of the basin, the hydrant-pipe connected with the water-main, a valve in said hydrant-pipe near its lower end adapted to close automatically when the water is flowing upward in the hydrant-pipe and to open automatically when the water is at rest therein, a solution of salt or some similar non-freezing liquid in said basin extending to near the top of the sewer drain-pipe, and connections between said valve and sewer drain-pipe located far beneath the surface of the brine.

8. In a hydrant, the combination with the water-tight basin, of the sewer drain-pipe extending upward therein to about half the depth of the basin, the hydrant-pipe connected with the water-main, a valve in said hydrant-pipe near its lower end adapted to close automatically when the water is flowing upward in the hydrant-pipe and to open automatically when the water is at rest therein, a solution of salt or some similar non-freezing liquid in said basin extending to near the top of the sewer drain-pipe, connections between said valve and sewer drain-pipe located far beneath the surface of the brine, a valve adapted to open the sewer drain-pipe at its lowermost point in the basin to drain out the brine, and means for operating said valve located near the top of the basin.

9. In a hydrant, the combination with the basin, of the hydrant-pipe connected with the water-main extending upward therethrough, means for automatically regulating the level at which the water in the pipe shall stand when the hydrant is not in use, a protecting liquid in the basin extending above the hydrant-pipe water-level, and the sewer drain-pipe extending upward in the basin above the level of the protecting liquid.

10. In a hydrant, the combination with the basin, of the hydrant-pipe connected with the water-mains extending upward therethrough, means for automatically regulating the level at which the water in the pipe shall stand when the hydrant is not in use, a protecting liquid in the basin extending above the hydrant-pipe water-level, the sewer drain-pipe extending upward in the basin above the level of the protecting liquid, and a valve in the drain-pipe opening near the bottom of the basin and adapted to discharge the protecting liquid into the sewer.

11. In a hydrant, the combination with the basin, of the hydrant-pipe connected with the water-mains extending upward therethrough, means for regulating the level at which the water in the pipe shall stand when the hydrant is not in use, a non-freezing liquid such as a solution of salt in the basin extending above the hydrant-pipe water-level, a sewer drain-pipe opening near the bottom of the basin, and a valve connected with said drain-pipe and adapted to open it to discharge the brine.

In testimony whereof I have signed my name to this specification in the presence of two subscribing witnesses.

JAMES PYE.

Witnesses:
 CARL MELTZER,
 WILLIAM G. BLOMSTRAN.